United States Patent [19]
Campion et al.

[11] Patent Number: 6,071,487
[45] Date of Patent: Jun. 6, 2000

[54] METHOD OF MANUFACTURING A SILICA POWDER

[75] Inventors: Jean-Florent Campion, Bois Colombes, France; Jacques Goudeau, Hickory, N.C.; Jean-Francois Chariot, Marly le Roi; Christelle Lavallade, Courdimanche, both of France

[73] Assignee: Alcatel, Paris, France

[21] Appl. No.: 09/116,337

[22] Filed: Jul. 16, 1998

[30] Foreign Application Priority Data

Jul. 17, 1997 [FR] France .................... 97 09071

[51] Int. Cl.$^7$ .................... C01B 33/157; C01B 33/12
[52] U.S. Cl. .................... 423/338; 423/335; 65/395
[58] Field of Search .................... 423/335, 338; 501/12; 65/395

[56] References Cited

U.S. PATENT DOCUMENTS

| | | | |
|---|---|---|---|
| 3,954,431 | 5/1976 | Fleming, Jr. et al. .................... | 501/65 |
| 4,042,361 | 8/1977 | Bihuniak et al. . | |
| 4,200,445 | 4/1980 | Bihuniak .................... | 423/337 |
| 4,767,429 | 8/1988 | Fleming et al. .................... | 423/338 |
| 4,810,415 | 3/1989 | Winkelbauer et al. .................... | 423/335 |
| 5,063,179 | 11/1991 | Menashi et al. .................... | 423/338 |
| 5,888,587 | 3/1999 | Campion .................... | 427/163.2 |

FOREIGN PATENT DOCUMENTS

| | | |
|---|---|---|
| 0271281A2 | 6/1988 | European Pat. Off. . |
| 0360479A2 | 3/1990 | European Pat. Off. . |
| 0578553A1 | 1/1994 | European Pat. Off. . |

OTHER PUBLICATIONS

Clasen, "Preparation of High–Purity Silica Glass Tubes by Centrifugal Casting of Colloidal Gels", J. of Materials Science Letters 7(1988) pp. 477–478 (No Month).

Clasen, "Preparation and Sintering of High–Density Green Bodies to High Purity Silica Glasses", J. of Non. Crystalline Solids 89(1987) 335–344 (No Month).

*Primary Examiner*—Ngoc-Yen Nguyen
*Attorney, Agent, or Firm*—Sughrue, Mion, Zinn, Macpeak & Seas, PLLC

[57] ABSTRACT

In the method, a suspension of silica particles in water is provided, the suspension is gelled, the resulting gel is dried under microwaves, the dried gel is fractioned into silica granules having a diameter lying in the range 10 $\mu$m to 1000 $\mu$m, having an apparent density of about 0.5 g/cm$^3$ to 0.6 g/cm$^3$, and a porosity of less than 20%, and the granules are screened in the range 100 $\mu$m to 500 $\mu$m. The suspension in water of silica particles is made by mixing silica soots having a size of less than 0.1 $\mu$m and silica grains having a size greater than 1 $\mu$m. Its maximum concentration in total weight is greater than that of a suspension of synthetic soots on their own, thereby making it possible to increase the production capacity of the method. Advantageously, the out-of-range granules rejected by the screening are recycled as silica grains for the aqueous suspension, thereby making it possible to increase the accumulated production efficiency of the method.

3 Claims, No Drawings

METHOD OF MANUFACTURING A SILICA POWDER

The invention relates to a method of manufacturing silica powder by a sol-gel technique, in which a suspension of silica particles is made in water, the suspension is gelled, the resulting gel is dried under microwaves, the dried gel is fractioned into silica granules having a diameter lying in the range 10 μm to 1000 μm presenting an apparent density of about 0.5 g/cm³ to 0.6 g/cm³, and the granules are screened to lie in the range 100 μm to 500μm.

BACKGROUND OF THE INVENTION

Such a method is known in particular from European patent application To. EP-0 578 553. The object of the invention is to improve the production capacity of the method described in that application, which is considered as forming an integral portion of the present description.

OBJECT AND SUMMARY OF THE INVENTION

For this purpose, the invention provides a method of manufacturing silica powder by a sol-gel technique, in which a suspension of silica particles is made in water, the suspension is gelled, the resulting gel is dried under microwaves, the dried gel is fractioned into silica granules having a diameter lying in the range 10 μm to 1000 μm presenting an apparent density of about 0.5 g/cm³ to 0.6 g/cm³ , and the granules are screened to lie in the range 100 μm to 500 μm, wherein the silica particles used comprise a mixture of silica soots having a size of less than 1 μm and of silica grains of size greater than 1 μm.

The aqueous solution made in this way reaches a maximum concentration in total weight of silica greater than the maximum concentration by weight of a suspension constituted solely by soot, with the maximum concentrations being respectively equal to 90% and 70%, for example. As a result, the production capacity of the method of the invention increases under the effect of the increase in the concentration of the aqueous suspension, with the screening efficiency being assumed to be constant and equal to that described in the above-mentioned application.

The soots may be synthetic soots.

Advantageously, the method of the invention is implemented in successive cycles such that for any of the cycles the silica grains used are out-of-range granules rejected by the screening between 100 μm and 500 μm of the granules manufactured during an immediately preceding cycle.

This gives rise to a progressive increase in the production capacity of each cycle due to the increasing total concentration by weight of silica at the end of each cycle, with th s nevertheless being limited by an asymptotic value. In addition, accumulated production efficiency measured in terms of accumulated weight of manufactured granules relative to the accumulated weight of synthetic soot input into each cycle increases with the number of cycles and approaches the theoretical value of unity.

The sole example below gives the values of the increases in accumulated efficiency and capacity of the method of the invention for a series of ten cycles.

MORE DETAILED DESCRIPTION

Sole example

The same aqueous suspension as in Example 1 of the above-mentioned application was made, and the same steps were applied thereto until the granules were screened between 100 μm and 500 μm, screening efficiency being equal to 70%. Cycle 1 is said to be a "priming" cycle.

The out-of-range granules were then recovered to be recycled in cycle 2, and so on.

At the beginning of each new cycle, a constant quantity of soot, e.g. 70 kg of synthetic soot, was mixed in a constant quantity of water, e.g. 30 kg, together with the out-of-range granules rejected by the screening of the immediately preceding cycle.

In the following table:

column 1 gives cycle number;

column 2 gives the concentration by weight in percentage terms of the silica particles in the mixture at the beginning of each cycle;

column 3 gives the quantity, in kg, of granules produced with size lying in the range 100 μm to 500 μm;

column 4 gives the quantity, in kg, of out-of-range granules rejected by the screening for the range 100 μm to 500 μm; and column 5 gives the accumulated efficiency of the method of the invention.

| 1 | 2 | 3 | 4 | 5 |
|---|---|---|---|---|
| 1 | 70 | 49 | 21 | 70 |
| 2 | 75 | 64 | 27 | 80 |
| 3 | 76 | 69 | 29 | 86 |
| 4 | 77 | 69 | 30 | 89 |
| 5 | 77 | 70 | 30 | 91 |
| 6 | 77 | 70 | 30 | 93 |
| 7 | 77 | 70 | 30 | 94 |
| 8 | 77 | 70 | 30 | 95 |
| 9 | 77 | 70 | 30 | 95 |
| 10 | 77 | 70 | 30 | 96 |

Cycles 2 and 3 during which the concentration by weight of silica particles in the aqueous suspension increases rapidly are referred to as "start-up" cycles. This concentration becomes constant during cycle 4 et seg., which cycles are referred to as "stabilized" cycles.

It should be observed that the aqueous suspension in the stabilized cycles has viscosity that is about one-third the viscosity of the priming cycle, thereby providing savings in power consumption by the tool for dispersing silica particles in water.

Between cycle 1 and stabilized cycle 10, the concentration by weight of the aqueous suspension goes from 70% to 77%, and the accumulated production efficiency goes from 70% to 96%.

These results illustrate the increase in overall production capacity and efficiency of the method of the invention.

What is claimed is:

1. A method of manufacturing silica powder by a sol-gel technique, comprising forming a suspension of silica particles in water, gelling the suspension, drying the resulting gel under microwaves, fractionating the dried gel into silica granules having a diameter lying in the range 10 μm to 1000 μm and having an apparent density of about 0.5 g/cm³ to 0.6 g/cm³, and screening the granules so as to provide granules having a diameter in the range 100 μm to 500 μm, wherein the silica particles used comprise a mixture of silica soots having a size of less than 1 μm and of silica grains of size greater than 1 μm.

2. A method according to claim 1, in which the out-of-range granules rejected by the screening for the range 100 μm to 500 μm are recycled as silica grains for the aqueous suspension.

3. A method according to claim 1, wherein said soots are synthetic soots.

* * * * *